US012741431B2

(12) United States Patent
Yoon et al.

(10) Patent No.: US 12,741,431 B2
(45) Date of Patent: Sep. 22, 2026

(54) METHOD FOR WINDING FILAMENT AND PRESSURE VESSEL MANUFACTURED THEREBY

(71) Applicant: ILJIN HYSOLUS CO., LTD, Wanju-gun (KR)

(72) Inventors: Su Jin Yoon, Wanju-gun (KR); Jun Young Kang, Wanju-gun (KR); Jong Lyul Kim, Wanju-gun (KR); Hye Son Kim, Wanju-gun (KR)

(73) Assignee: ILJIN HYSOLUS CO., LTD, Wanju-gun (KR)

( * ) Notice: Subject to any disclaimer, the term of this patent is extended or adjusted under 35 U.S.C. 154(b) by 115 days.

(21) Appl. No.: 18/567,302

(22) PCT Filed: May 9, 2022

(86) PCT No.: PCT/KR2022/006595
§ 371 (c)(1),
(2) Date: Dec. 5, 2023

(87) PCT Pub. No.: WO2022/260289
PCT Pub. Date: Dec. 15, 2022

(65) Prior Publication Data
US 2024/0262050 A1 Aug. 8, 2024

(30) Foreign Application Priority Data
Jun. 7, 2021 (KR) ........................ 10-2021-0073415

(51) Int. Cl.
*B29C 70/32* (2006.01)
*B29K 63/00* (2006.01)
(Continued)

(52) U.S. Cl.
CPC ................ *B29C 70/32* (2013.01); *F17C 1/06* (2013.01); *B29K 2063/00* (2013.01);
(Continued)

(58) Field of Classification Search
CPC .................................. B29C 70/32; F17C 1/06
See application file for complete search history.

(56) References Cited

U.S. PATENT DOCUMENTS

2007/0205201 A1 9/2007 Cundiff et al.
2020/0141538 A1 5/2020 Umetsu

FOREIGN PATENT DOCUMENTS

DE 4126251 A1 2/1993
EP 0810081 A1 * 12/1997 ......... B29C 53/8016
(Continued)

OTHER PUBLICATIONS

Office action dated Oct. 24, 2024, Japanese Patent Application No. 2023-575356, 10 pages.
(Continued)

*Primary Examiner* — Benjamin L Utech
(74) *Attorney, Agent, or Firm* — Stinson LLP

(57) ABSTRACT

The present invention provides a filament winding method including operation (a) of forming a first pattern layer by winding a fiber reinforcement composite material on an outer circumferential surface of a liner, operation (b) of forming a first composite layer by winding the fiber reinforcement composite material on an upper surface of the first pattern layer to form a second pattern layer, and operation (c) of forming a second composite layer by re-forming a first pattern layer on an upper surface of the first composite layer and forming a second pattern layer on an upper surface of the first pattern layer, wherein composite layers are repeatedly formed according to Expression 1, wherein $C_N \leq 5$ and $C_N$ denotes the total number of the composite layers.

7 Claims, 4 Drawing Sheets

(51) Int. Cl.

| | |
|---|---|
| ***B29K 105/10*** | (2006.01) |
| ***B29K 307/04*** | (2006.01) |
| ***B29L 31/00*** | (2006.01) |
| ***F17C 1/06*** | (2006.01) |

(52) U.S. Cl.

CPC .... *B29K 2105/103* (2013.01); *B29K 2307/04* (2013.01); *B29L 2031/7156* (2013.01); *F17C 2203/0604* (2013.01); *F17C 2203/0624* (2013.01); *F17C 2203/067* (2013.01); *F17C 2209/2154* (2013.01); *F17C 2209/232* (2013.01); *F17C 2260/013* (2013.01)

(56) References Cited

FOREIGN PATENT DOCUMENTS

| | | | |
|---|---|---|---|
| JP | 2012149739 | A | 8/2012 |
| JP | 2012159158 | A | 8/2012 |
| JP | 2013108521 | A | 6/2013 |
| JP | 2016097561 | A | 5/2016 |
| KR | 101371593 | B1 | 3/2014 |
| KR | 101818845 | B1 | 1/2018 |
| KR | 101846733 | B1 | 4/2018 |
| KR | 102217830 | B1 | 2/2021 |

OTHER PUBLICATIONS

Extended European Search Report, European Application No. 22820417.8, Apr. 22, 2025, 9 pages.

* cited by examiner

FIG. 4

| ITEMS | EXAMPLE 1 | COMPARATIVE EXAMPLE 1 |
|---|---|---|
| MAXIMUM STRESS | | |
| MAXIMUM STRESS OF CYLINDER PART MPa | 2,518MPa | 2,625MPa |

FIG. 5

| ITEMS | EXAMPLE 1 | COMPARATIVE EXAMPLE 1 |
|---|---|---|
| PICTURE OF RUPTURE OF CYLINDER PART | | |
| RUPTURE PRESSURE OF CYLINDER PART bar | 1,706bar | 1,619bar |

FIG. 6

| | MANUFACTURE EXAMPLE 2 | MANUFACTURE EXAMPLE 3 | MANUFACTURE EXAMPLE 4 | MANUFACTURE EXAMPLE 5 | MANUFACTURE EXAMPLE 6 |
|---|---|---|---|---|---|
| 1,575bar | | | | | |
| EXPECTED RUPTURE PRESSURE | 1896.44bar | 1889.62bar | 1902.17bar | 1989.73bar | 1904.47bar |

METHOD FOR WINDING FILAMENT AND PRESSURE VESSEL MANUFACTURED THEREBY

CROSS REFERENCE TO RELATED APPLICATIONS

This patent application is a U.S. national stage application of International Application No. PCT/KR2022/006595, filed May 9, 2022, the entire disclosure of which is incorporated by reference in its entirety for all purposes.

TECHNICAL FIELD

The present invention relates to a filament winding method. More specifically, the present invention relates to a filament winding method for increasing the durability of a pressure vessel, and a pressure vessel manufactured thereby.

BACKGROUND

Hydrogen fuel cell vehicles are in the spotlight as a next-generation transportation, and pressure vessels for hydrogen fuel is also actively developed. Among methods of manufacturing a pressure vessel for storing high-pressure hydrogen, a filament winding molding method mainly used to manufacture circular products is a composite molding method of manufacturing a rotationally symmetrical structure by winding resin-impregnated continuous fibers around a cylindrical rotating mold (mandrel) and then curing the wound resin-impregnated continuous fibers and is classified into a wet winding method in which fibers are impregnated while passing through a resin bath just before the fibers are wound around a liner and a dry winding method using a tow prepreg.

The winding method includes hoop wrapped (vertical winding) and helical wrapped (spiral winding), and a hoop pattern layer formed accordingly prevents damage to a cylinder part of the liner by supporting a pressure of a pressure vessel, and a helical pattern layer is used to reinforce a dome part.

In this case, as more hoop pattern layers are formed in a circumferential direction of the liner, it is possible to withstand the pressure of the vessel, thereby increasing the durability of the overall pressure vessel, but when the hoop pattern layers are formed in the circumferential direction, a step caused by the patterns is formed.

Therefore, in a real pressure vessel, a filament winding method of forming the plurality of hoop pattern layers in an inner area of a liner to reinforce a circumferential direction has limitations and has a problem in which the durability of the pressure vessel cannot be effectively increased.

Therefore, there is an urgent need to develop a new filament winding method for increasing the durability of the pressure vessel.

As the background technology for the present invention, a filament winding device is disclosed in Korean Patent No. 10-2217830.

SUMMARY

The present invention is directed to increasing the durability of a pressure vessel by improving a filament winding method.

The present invention is also directed to providing a pressure vessel with increased durability by removing a vulnerable portion caused by forming a hoop pattern layer.

The objects and other objects of the present invention can be achieved by the present invention to be described below.

BRIEF DESCRIPTION OF THE DRAWINGS

FIG. 4 illustrates results of computer simulation of maximum stresses and rupture pressures for charging pressures of the pressure vessel manufactured by the filament winding method according to the one specific embodiment of the present invention and the conventional pressure vessel in which a hoop pattern layer and a helical pattern layer are formed alternately.

FIG. 5 shows pictures of the rupture of a cylinder part due to the fluid charging of the pressure vessel manufactured by the filament winding method according to the one specific embodiment of the present invention and the conventional pressure vessel in which the hoop pattern layer and the helical pattern layer are formed alternately.

FIG. 6 illustrates an expected rupture pressure according to an increase in the number of hoop pattern layers inside a composite layer.

DETAILED DESCRIPTION

Figure 1:
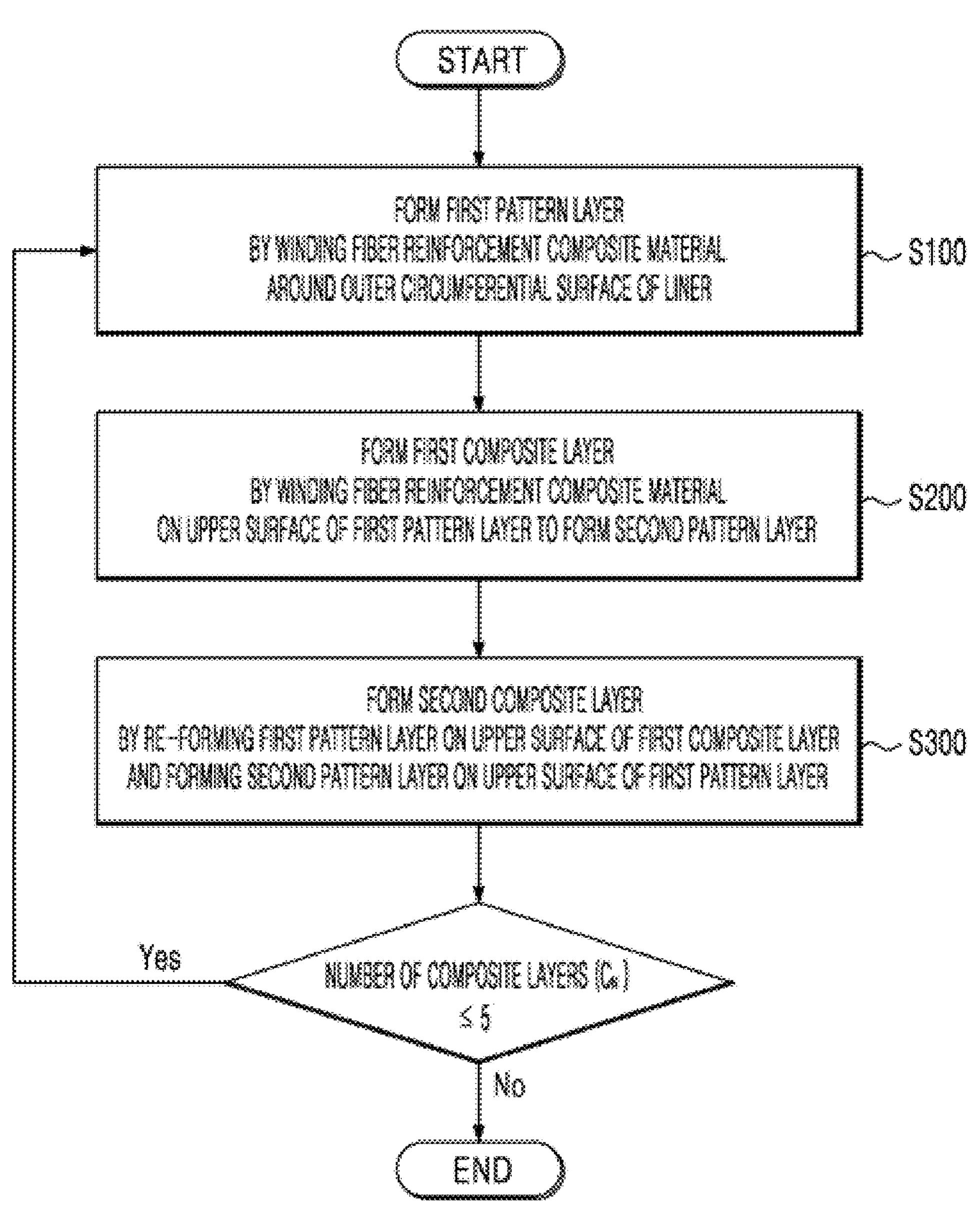
FIG. 1 is a process flowchart showing a filament winding method according to one specific embodiment of the present invention.

1. One aspect of the present invention relates to a filament winding method for a pressure vessel.

The filament winding method includes operation (a) of forming a first pattern layer by winding a fiber reinforcement composite material on an outer circumferential surface of a liner, operation (b) of forming a first composite layer by winding the fiber reinforcement composite material on an upper surface of the first pattern layer to form a second pattern layer, and operation (c) of forming a second composite layer by re-forming a first pattern layer on an upper surface of the first composite layer and forming a second pattern layer on an upper surface of the first pattern layer, wherein composite layers are repeatedly formed according to Expression 1 below.

$$C_N \leq 5 \qquad \text{Expression 1}$$

Here, $C_N$ denotes the total number of the composite layers.

2. In the first specific embodiment, operation (c) may further include forming a helical pattern layer after forming the second pattern layer.
3. In the first or second specific embodiment, the first pattern layer may be a hoop pattern layer formed by winding the fiber reinforcement composite material in a circumferential direction of the liner.
4. In the third specific embodiment, the second pattern layer in operation (b) may be formed as a tube helical pattern layer by winding the fiber reinforcement composite material on the upper surface of the first pattern layer and may satisfy Expression 2 below.

$$N_1 > N_2 \quad \text{Expression 2}$$

Here, $N_1$ denotes the number of hoop pattern layers formed on an upper surface of the liner, and $N_2$ denotes the number of tube helical pattern layers formed on an upper surface of the hoop pattern layer.

5. In the third specific embodiment, in operation (c), the second pattern layer may be formed as a tube helical pattern layer by winding the fiber reinforcement composite material on the upper surface of the first pattern layer and may satisfy Expression 3 below.

$$N_3 \geq N_4 \quad \text{Expression 3}$$

Here, $N_3$ denotes the number of hoop pattern layers of the second composite layer, and $N_4$ denotes the number of tube helical pattern layers.

6. In any one of the first to fifth specific embodiments, a winding start point of the first pattern layer in operation (c) may be changed closer to a center of the liner than a winding start point of the first pattern layer in operation (a).

7. In the fourth or fifth specific embodiment, the tube helical pattern layer may be wound at an angle of about 60 to 89° with respect to an axial direction of the liner.

8. In any one of the first to seventh specific embodiments, the first pattern layer may be formed as a helical pattern layer by winding the fiber reinforcement composite material toward a dome part of the liner.

9. In the eighth specific embodiment, the second pattern layer in operation (b) may be formed as a hoop pattern layer by winding the fiber reinforcement composite material on the upper surface of the first pattern layer and may satisfy Expression 4 below.

$$N_5 > N_6 \quad \text{Expression 4}$$

Here, $N_5$ denotes the number of hoop pattern layers formed on the upper surface of the helical pattern layer, and No denotes the number of helical pattern layers.

10. In the eighth specific embodiment, in operation (c), the first pattern layer may be formed as a tube helical pattern layer by winding the fiber reinforcement composite material on the upper surface of the first composite layer, and the second pattern layer may be formed as a hoop pattern layer by winding the fiber reinforcement composite material on the upper surface of the first pattern layer and may satisfy Expression 5 below.

$$N_7 > N_8 \quad \text{Expression 5}$$

Here, $N_7$ denotes the number of hoop pattern layers of the second composite layer, and $N_8$ denotes the number of tube helical pattern layers.

11. In the tenth specific embodiment, the tube helical pattern layer may be wound at an angle of about 60 to 89° with respect to an axial direction of the liner.

12. In the fifth or tenth specific embodiment, the number of hoop pattern layers formed in the circumferential direction of the liner may be in a range of about 20 to 35% of the number of layers formed on an entirety of the liner.

13. In the fifth or tenth specific embodiment, a ratio of the number of tube helical pattern layers to the number of hoop pattern layers of the first composite layer may be in a range of 5 to 10:1 to 5, and a ratio of the number of tube helical pattern layers to the number of hoop pattern layers of the second composite layer may be in a range of about 1 to 2:1.

14. Another aspect of the present invention relates to a pressure vessel.

The pressure vessel includes a liner, and a composite layer formed on an outer circumferential surface of the liner by the filament winding method.

15. In the fourteenth specific embodiment, a rupture pressure of a cylinder part of the liner may be about 1,700 bar or higher.

16. In the fourteenth or fifteenth specific embodiment, a maximum stress of the cylinder part of the liner may be in a range of about 2,500 to 2,600 MPa.

In a filament winding method according to the present invention, by improving a process of forming a composite layer to reduce the usage of expensive carbon fiber, it is possible to reduce the manufacturing cost of a pressure vessel and at the same time, increase the weight efficiency of the pressure vessel, and increase durability by 8% or more compared to a pressure vessel manufactured by a conventional filament winding method of alternately stacking a hoop pattern layer and a helical pattern layer.

Hereinafter, the present invention will be described in more detail with reference to the accompanying drawings. However, the following drawings are provided only to help the understanding of the present invention, and the present invention is not limited by the following drawings. In addition, since shapes, sizes, ratios, angles, numbers, and the like disclosed in the drawings are illustrative, the present invention is not limited to the illustrated items.

The same reference number indicates the same components throughout the specification. In addition, in describing the present invention, when it is determined that the detailed description of a related known technology may unnecessarily obscure the gist of the present invention, a detailed description thereof will be omitted.

When terms “comprises,” “has,” “consists of,” and the like described in the specification are used, other parts may be added unless “only” is used. When a component is expressed in the singular, this includes a case in which the component is provided as a plurality of components unless specifically stated otherwise.

In construing a component, the component is construed as including the margin of error even when there is no separate explicit description.

When the positional relationship between two parts is described as “on,” “on an upper surface,” “on a lower portion,” “next to,” or the like, one or more other parts may be positioned between the two parts unless “immediately” or “directly” is used.

The positional relationships such as “upper portion,” “upper surface,” “lower portion,” “lower surface,” and the like are only described based on the drawings and do not represent absolute positional relationships. In other words, depending on an observed position, positions of “upper portion” and “lower portion” or “upper surface” and “lower surface” may be interchanged.

In the specification, the term "a to b" indicating a numerical range is defined as "≥a and ≤b."

One aspect of the present invention relates to a filament winding method for a pressure vessel.

FIG. 1 is a process flowchart of a filament winding method according to one specific embodiment of the present invention.

Referring to FIG. 1, the filament winding method includes (a) forming a first pattern layer by winding a fiber reinforcement composite material on an outer circumferential surface of a liner, (b) forming a first composite layer by winding the fiber reinforcement composite material on an upper surface of the first pattern layer to form a second pattern layer, and (c) forming a second composite layer by re-forming the first pattern layer on an upper surface of the first composite layer and forming the second pattern layer on the upper surface of the first pattern layer.

First, the first pattern layer is formed by providing the liner and winding a fiber reinforcement composite material on the outer circumferential surface of the liner (S100).

The liner may provide a space in which high-pressure fuel, preferably, hydrogen, is stored, may be made of a plastic material, and may include a boss part having a nozzle through which the fuel may be injected or discharged and provided at one end of the liner.

The liner may include dome parts disposed at both ends thereof and a cylinder part disposed at the center thereof, and the dome part may have a constant curvature, an inner area S may be formed between inflection points C at which the dome parts and the cylinder part are connected, and the fiber reinforcement composite material may be wound around the inner area S to withstand a pressure applied to the cylinder part.

The first pattern layer is formed by winding the fiber reinforcement composite material on the outer circumferential surface of the liner.

The fiber reinforcement composite material may be one of a carbon fiber reinforcement composite material, a glass fiber reinforcement composite material, and an aramid fiber reinforcement composite material.

Specifically, the fiber reinforcement composite material may be formed by impregnating carbon fiber, glass fiber, or aramid fiber into a thermosetting resin such as a nano particle epoxy, an epoxy, a modified epoxy, or a polyester or a thermoplastic resin such as polyamid.

It is possible to greatly increase the durability of the pressure vessel by winding the above fiber reinforcement composite material to form the first pattern layer and the second pattern layer so that the first composite layer is formed in contact with the outer circumferential surface of the liner.

Here, the first pattern layer is a layer formed by winding the fiber reinforcement composite material on the outer circumferential surface of the liner, and the second pattern layer is a layer formed by winding the fiber reinforcement composite material on an upper surface of the first pattern layer.

In one specific embodiment, the first pattern layer may be formed as a hoop pattern layer provided as a plurality of layers by winding the fiber reinforcement composite material in a circumferential direction of the liner.

The first pattern layer may be formed by being directly wound on the outer circumferential surface of the liner and may start to be wound from any one side of both ends of a cylinder part of the liner, and the first pattern layer may be formed in the inner area S of the cylinder part.

When the first pattern layer is formed as the hoop pattern layer, it is possible to effectively increase a rupture pressure of the cylinder part by supporting a pressure applied to the inner area of the liner.

In this case, as more hoop pattern layers are formed in a circumferential direction of the liner, it is possible to withstand the pressure of the vessel, thereby increasing the durability of the overall pressure vessel, but when the hoop pattern layers are formed in the circumferential direction, a step caused by the patterns is formed.

Staircase-shaped steps may be formed on side surfaces of the hoop pattern layers when the hoop pattern layer is formed as a plurality of hoop pattern layers, a size of the step may be increased when the hoop pattern layer is consecutively stacked, then when the fiber reinforcement composite material is wound with a helical pattern in the winding process, the fiber reinforcement composite material may be separated from a stepped portion to move down or it may be difficult to wind the fiber reinforcement composite material at an accurate position, thereby increasing a defect rate in a manufacturing process, and when the helical pattern layer is formed directly on an upper surface of the step, a space may be formed by the step, and the space may not support the pressure applied to the liner to cause vulnerability, resulting in damage to the pressure vessel. Therefore, there are limitations to a method of increasing the durability of the pressure vessel by consecutively stacking the hoop pattern layer.

The first composite layer is formed by winding the fiber reinforcement composite material on the upper surface of the first pattern layer to form the second pattern layer (S200).

The first composite layer includes the first pattern layer and the second pattern layer, and when the first pattern layer is first formed as the hoop pattern layer, the second pattern layer is formed on the upper surface of the hoop pattern layer as a tube helical pattern layer.

When the second pattern layer is formed as the tube helical pattern layer, the second pattern layer may formed to directly surround an upper surface of the step formed on the side surface of the hoop pattern layer of the first pattern layer, and since the tube helical pattern layer is maximally in surface contact with the upper surface of the step, the space formed by the step may become small even when the hoop pattern layer is repeatedly formed, thereby reducing a vulnerable portion of the composite layer and greatly increasing the durability of the pressure vessel.

When the second pattern layer is formed as the tube helical pattern layer, it is possible to effectively increase the durability of a circumferential portion of the liner by forming a plurality of hoop pattern layers of the first pattern layer.

In one specific embodiment, the second pattern layer in operation S200 may be formed as the tube helical pattern layer by winding the fiber reinforcement composite material on the upper surface of the first pattern layer and may satisfy Expression 2 below.

$$N_1 > N_2 \quad \text{Expression 2}$$

Here, $N_1$ denotes the number of hoop pattern layers formed on the upper surface of the liner, and $N_2$ denotes the number of tube helical pattern layers formed on the upper surface of the hoop pattern layer.

The number of hoop pattern layers formed on the upper surface of the liner is greater than the number of tube helical pattern layers formed on the upper surface of the hoop pattern layer.

For example, when the first pattern layer is formed as four hoop pattern layers, the second pattern layer may be formed as one layer to three layers.

It is possible to greatly increase the durability of the cylinder part by increasing the number of hoop pattern layers according to Expression 2, and since the tube helical pattern layer reduces the step formed by the hoop pattern layer to effectively reduce the vulnerable portion, a plurality of hoop pattern layers may be stacked by consecutively stacking the hoop pattern layer.

When the first pattern layer is formed as the plurality of hoop pattern layers according to Expression 2 and the tube helical pattern layer supports the hoop pattern layers, it is possible to determine the optimum number of hoop pattern layers capable of most effectively supporting a pressure applied to a circumference of the cylinder part of the liner, and since the first pattern layer is directly formed on the outer circumferential surface of the liner, it is possible to prevent the rupture of the liner by effectively supporting the pressure applied to the liner.

The second composite layer is formed by re-forming the first pattern layer on the upper surface of the first composite layer and forming the second pattern layer on the upper surface of the first pattern layer (S300).

After forming the first composite layer in operation S200, the second composite layer is formed in operation S300.

Specifically, the second composite layer is formed by forming the first pattern layer on the upper surface of the first composite layer by the same method and forming the second pattern layer on the upper surface of the first pattern layer.

In one specific embodiment, in operation S300, the second pattern layer may be formed as the tube helical pattern layer by winding the fiber reinforcement composite material on the upper surface of the first pattern layer and may satisfy Expression 3 below.

$$N_3 \geq N_4 \qquad \text{Expression 3}$$

Here, $N_3$ denotes the number of hoop pattern layers of the second composite layer, and $N_4$ denotes the number of tube helical pattern layers.

The hoop pattern layer may also be formed on the second composite layer, thus a step is formed, and the tube helical pattern layer surrounding the upper portion of the step is formed to reduce the step formed by the hoop pattern layer so that more hoop pattern layers are consecutively formed.

For example, when the second composite layer is formed of three hoop pattern layers as the first pattern layer, the second pattern layer may be formed as three or less tube helical pattern layers, and preferably, two layers may be first formed therein and then one additional layer may be consecutively formed therein.

According to Expression 2, since the plurality of hoop pattern layers are formed in the first composite layer to sufficiently increase the durability of the cylinder part, it is preferable that the number of hoop pattern layers of the second composite layer becomes smaller than that of the first composite layer.

When the second composite layer is formed according to Expression 3, it is possible to prevent product defects and the degradation of the durability of the pressure vessel due to the step even when the hoop pattern layer is increased and reinforce the cylinder part of the liner even when the numbers of hoop pattern layers and tube helical pattern layers of the second composite layer are decreased, thereby reducing the usage of the fiber reinforcement composite material and greatly increasing the manufacturing efficiency of the pressure vessel.

In one specific embodiment, S300 may further include forming the second pattern layer and forming a helical pattern layer.

When the helical pattern layer is formed, it is possible to reinforce the durability of the dome part, and all the composite layers of the liner may be formed uniformly.

Specifically, the helical pattern layer may be formed at an angle of about 10 to 42° and preferably formed as a plurality of layers.

The helical pattern layer may be formed to form the composite layer on the entirety of the liner including the dome part.

In one specific embodiment, a winding start point of the first pattern layer in operation S200 may be changed closer to the center of the liner than a winding start point of the first pattern layer in operation S100.

Specifically, when the first pattern layer in operation S300 is changed closer to the center of the inner area of the liner than the first pattern layer in operation S100, it is possible to more effectively reduce the step formed by the hoop pattern layer.

In one specific embodiment, the tube helical pattern layer may be wound at an angle of about 60 to 89° with respect to an axial direction of the liner.

Typically, the helical pattern layer may be formed by being wound at a low angle of about 5 to 44° with respect to the axial direction of the center of the liner, but the tube helical pattern layer may be preferably wound at a higher angle in order to be wound directly on the step formed by the previously formed hoop pattern layer and wound in the range to effectively reduce the step formed by the hoop pattern layer.

When the winding angle of the tube helical pattern layer is smaller than a value in the range, it is difficult to reduce the step formed by the hoop pattern layer, and when the winding angle exceeds the value in the range, the efficiency of forming the tube helical pattern layer is greatly reduced.

After the first composite layer is formed in operation S300, the composite layer may be repeatedly formed according to Expression 1 below.

$$C_N \leq 5 \qquad \text{Expression 1}$$

Here, $C_N$ denotes the total number of composite layers.

By repeatedly forming the composite layer according to Expression 1, it is possible to increase the rupture pressure of the liner and greatly increase the durability of the pressure vessel by reducing the stress between the liner and the composite layer.

When the plurality of composite layers are formed in the range, it is possible to more preferably increase the durability by about 8% or more compared to a case in which the hoop pattern layer and the helical pattern layer are simply formed alternately, but it is also possible to increase the number of composite layers in order to increase the durability of the pressure vessel.

Meanwhile, in operation S100, the first pattern layer may be formed as a helical pattern layer.

In one specific embodiment, the first pattern layer may be first formed as the helical pattern layer by winding the fiber reinforcement composite material toward the dome part of the liner.

The first pattern layer may be formed as the helical patter layer that starts from the dome part to be wound at a lower angle with respect to the axial direction of the liner than the hoop pattern layer.

It is possible to increase the durability of the cylinder part of the liner by consecutively forming the hoop pattern layers on the upper surface of the helical pattern layer even when the helical pattern layer is formed.

In one specific embodiment, the second pattern layer in operation S200 may be formed as a hoop pattern layer by winding the fiber reinforcement composite material on the upper surface of the first pattern layer and may satisfy Expression 4 below.

$$N_5 > N_6 \qquad \text{Expression 4}$$

Here, $N_5$ denotes the number of hoop pattern layers formed on the upper surface of the helical pattern layer, and No denotes the number of helical pattern layers.

More hoop pattern layers than the helical pattern layers may be formed, and it is possible to effectively increase the durability of the liner in the range.

In one specific embodiment, in operation S300, the second composite layer may include the first pattern layer formed as a tube helical pattern layer by winding the fiber reinforcement composite material on the upper surface of the first composite layer and the second pattern layer formed as a hoop pattern layer by winding the fiber reinforcement composite material on the upper surface of the first pattern layer and satisfy Expression 5 below.

$$N_7 > N_8 \qquad \text{Expression 5}$$

Here, $N_7$ denotes the number of hoop pattern layers of the second composite layer, and $N_8$ denotes the number of tube helical pattern layers.

When the tube helical pattern layer is formed on the upper surface of the hoop pattern layer in the range, it is possible to effectively prevent defects of the pressure vessel and damage to the liner due to the step formed by the hoop pattern layer.

Even in this case, the tube helical pattern layer may be wound at an angle of about 60 to 89° with respect to the axial direction of the liner and directly in surface contact with the upper surface of the hoop pattern layer to reduce a space in which the hoop pattern layer is formed on the side surface of the liner and effectively support the pressure applied to the liner.

In one specific embodiment, the number of hoop pattern layers formed in the circumferential direction of the liner may be in a range of about 20 to 35% of the number of layers formed on the entirety of the liner.

Since the hoop pattern layers may be consecutively and repeatedly stacked in the first composite layer and the second composite layer to greatly increase the rupture pressure of the pressure vessel, when the hoop pattern layer is formed in the range, it is possible to reduce the usage of the fiber reinforcement composite material, and effectively increase the rupture pressure of the cylinder part of the liner and reduce the stress between the composite layer and the liner compared to a case in which two or more hoop pattern layers are consecutively stacked or a case in which the hoop pattern layer and the helical pattern layer are formed alternately.

In one specific embodiment, a ratio of the number of tube helical pattern layers to the number of hoop pattern layers of the first composite layer may be in a range of about 5 to 10:1 to 5, and a ratio of the number of tube helical pattern layers to the number of hoop pattern layers of the second composite layer may be in a range of about 1 to 2:1.

When the hoop pattern layer is formed in the first composite layer and the second composite layer in the range, it is possible to not only effectively increase the rupture pressure of the cylinder part due to an increase in the number of hoop pattern layers, but also easily secure target durability of the liner by forming the hoop pattern layer by up to a rate of about 90% at the beginning of forming the composite layer, and thereafter, it is possible to finally adjust the durability of the pressure vessel through additionally forming the composite layer, thereby greatly increasing manufacturing process efficiency.

Another aspect of the present invention relates to the pressure vessel.

Figure 2:
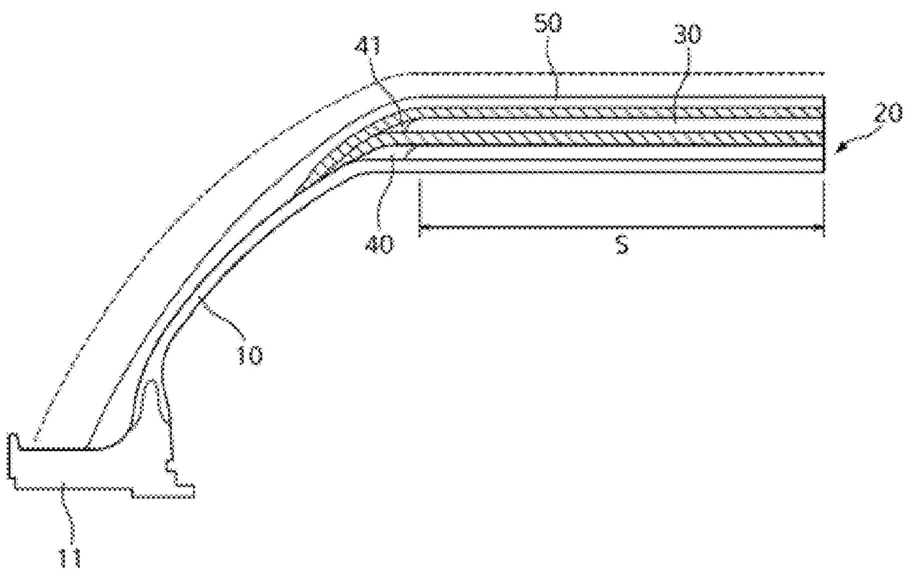
FIG. 2 is a schematic diagram illustrating a conventional process of forming a composite layer of a pressure vessel.
Figure 3:
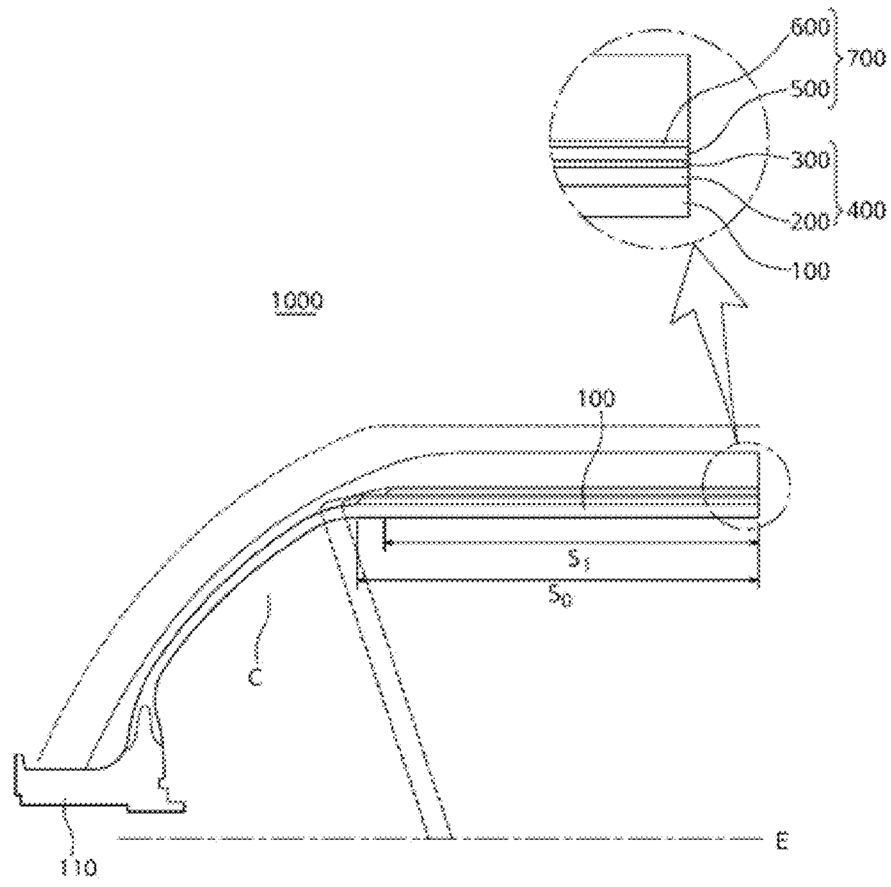
FIG. 3 is a schematic diagram of a pressure vessel in which a hoop pattern layer and a tube helical pattern layer according to one specific embodiment of the present invention are formed.

FIG. 2 is a schematic diagram illustrating a process of forming a composite layer of a pressure vessel, and FIG. 3 is a schematic diagram of a pressure vessel in which a hoop pattern layer and a tube helical pattern layer according to one specific embodiment of the present invention are formed.

First, referring to FIG. 2, when the hoop pattern layer 20 is conventionally formed by being consecutively stacked in the inner area S in the circumferential direction of the liner 10, it is possible to most effectively increase the durability of the cylinder part, but when a step is formed on side surfaces of both ends of the liner and the helical pattern layer 30 is formed directly on the upper surface of the hoop pattern layer 20, a space 40 is formed therein, and when spaces 40 and 41 repeatedly overlap each other, vulnerability occurs in the composite layer, and the composite layer may not support the pressure of the liner, thereby eventually damaging the pressure vessel.

Referring to FIG. 3, a pressure vessel 1000 according to the present invention includes a liner 100 and composite layers 400 and 700.

The liner 100 is provided with a boss 110 formed on one end thereof and has a storage space formed therein.

The composite layers 400 and 700 include the first composite layer 400 and the second composite layer 700.

Specifically, the first composite layer 400 is formed by forming a plurality of hoop pattern layers 200 on an outer circumferential surface of the liner 100 as a first pattern layer, and then winding a fiber reinforcement composite material and winding the highly-angled tube helical pattern layer 300 as a second pattern layer.

When the highly-angled tube helical pattern layer 300 is in surface contact with a step formed on a side surface of the hoop pattern layer 200 provided as a plurality of hoop pattern layers, it is possible to reduce a space formed by the step, thereby effectively preventing the occurrence of vulnerability due to the pressing of the liner.

The second composite layer 700 includes a first pattern layer 500 and a second pattern layer 600.

The first pattern layer 500 and the second pattern layer 600 are members that are the same as those of the first composite layer 400.

In this case, a winding start point of the first pattern layer 500 may be disposed at a position S1 changed closer to a center of an inner area than a start point S0 at which the first pattern layer 200 of the first composite layer 400 is wound, and even when the composite layer is provided as a plurality of composite layers, it is possible to reduce the step caused by forming the hoop pattern layer when the start point of the first pattern layer is changed to be close to the center of the inner area.

The formation of the plurality of hoop pattern layers in the circumferential direction of the liner is the most effective method capable of increasing the rupture pressure of the cylinder part of the pressure vessel and reducing a maximum stress, but when the hoop pattern layer is really formed by being consecutively stacked, the step formed on the side surface of the hoop pattern layer, and when the helical pattern layer is formed directly on the upper surface of the hoop pattern layer, it is not possible to effectively support the pressure of the liner due to the space, thereby causing damage, and thus it is very difficult to consecutively form the hoop pattern layer.

The pressure vessel 1000 according to the one specific embodiment of the present invention may include the plurality of composite layers 400 and 700 by winding the fiber reinforcement composite material on the outer circumferential surface of the liner 100, and the first composite layer 400 may be formed by dividing the first pattern layer 200 and the second pattern layer 300, the second pattern layer 300 may be formed as the helical pattern layer when the first pattern layer 200 is formed as the hoop pattern layer, the second pattern layer 300 may be formed as the hoop pattern layer when the first pattern layer 200 is formed as the helical pattern layer, a larger number of hoop pattern layers may be stacked in the circumferential direction of the liner by forming the highly-angled tube helical pattern layer to decrease the space due to the step of the hoop pattern layer when the number of hoop pattern layers is increased, and it is possible to prevent product defects at the time of winding the fiber reinforcement composite material, thereby more effectively reinforcing the circumferential direction of the liner.

In the pressure vessel 1000, staircase-shaped steps due to the hoop pattern layers of the composite layer are reduced to increase the rupture pressure of the cylinder part and reduce the maximum stress, and thus the overall durability may be increased by up to 8%.

In one specific embodiment, the rupture pressure of the cylinder part of the liner may be about 1,700 bar or higher.

Specifically, a rupture pressure according to the results of computer simulation of an expected rupture pressure for a charging pressure of about 1,575 bar is about 1,700 bar or higher, and more specifically, the rupture pressure of the cylinder part of the liner is in a range of about 1,700 to 1,950 bar.

In one specific embodiment, when the composite layer is formed, the rupture pressure of the cylinder part is increased, thereby increasing the durability of the entirety of the pressure vessel.

The maximum stress of the cylinder part of the liner may be in a range of about 2,500 to 2,600 MPa.

The composite layer formed by the filament winding method can reduce the stress in the circumferential direction, and thus the maximum stress of the cylinder part of the liner may be specifically in a range of about 2,500 to 2,550 MPa.

In the composite layer, the number of stacked hoop pattern layers may be increased, and the number of hoops therein may be also increased, thereby effectively reducing the stress occurring between the cylinder part of the liner and the composite layer, and thus it is possible to greatly increase the durability of the pressure vessel.

Hereinafter, exemplary examples are presented to help the understanding of the present invention, but the following examples are merely illustrative of the present invention and the scope of the present invention is not limited to the following examples.

Example 1: Manufacturing Pressure Vessel

A composite layer was formed by winding a fiber composite material impregnating carbon fiber into an epoxy resin on an outer circumferential surface of a liner that is a plastic resin, and a first composite layer was formed first by first forming a hoop pattern layer as four layers (Ply) by a wet method and stacking one tube helical pattern layer at a high angle of 89° with respect to an axial direction of the liner.

A second composite layer was formed by re-forming the hoop pattern layer as three layers on an upper surface of the first composite layer and consecutively forming one tube helical pattern layer at an angle of about 80°.

A helical pattern layer was added to an upper surface of the tube helical pattern layer of the second composite layer, and a dome part was reinforced.

The composite layer was formed as three composite layers by the same method.

In order to prevent the buckling of the liner due to the tension of the carbon fiber, air was injected in a winding process to maintain a shape of the liner.

Finally, the pressure vessel was completed by adjusting the number (Ply) of hoop pattern layers of the composite layer to about 32.3% of the total number of pattern layers.

Comparative Example 1

A pressure vessel was manufactured by the same method as that of Example 1, but instead of a process of forming the first composite layer and the second composite layer, the helical pattern layer and the hoop pattern layer were alternately stacked with the same thickness as that of Example 1 to complete a pressure vessel.

Experimental Example 1: Test for Durability of Pressure Vessel

FIG. 4 illustrates results of computer simulation of maximum stresses and rupture pressures for charging pressures of the pressure vessel manufactured by the filament winding method according to the one specific embodiment of the present invention and the conventional pressure vessel in which a hoop pattern layer and a helical pattern layer are formed alternately, and FIG. 5 shows pictures of the rupture of a cylinder part due to the fluid charging of the pressure vessel manufactured by the filament winding method according to the one specific embodiment of the present invention and the conventional pressure vessel (Comparative Example 1) in which the hoop pattern layer and the helical pattern layer are formed alternately.

Referring to FIGS. 4 and 5, as a result of performing a computer simulation on principal stress (unit: MPa) and a rupture pressure (unit: bar) for a charging pressure of about 1,575 bar of the pressure vessel according to Example 1 using an ABAQUS program, in Example 1, it was confirmed that the maximum stress of the cylinder part was reduced by about 4% or more, and the rupture pressure was also increased by about 5% or more.

In addition, when the durability of pressure vessels according to various materials was checked by changing the fiber reinforcement composite material, it was confirmed that durability was increased by up to 8% on average.

Experimental Example 2: Increase in Durability According to Increase in the Number of Inner Hoop Layers When a larger number of hoop pattern layers is formed in the first composite layer than in the second composite layer, a degree of the increase in the durability of the pressure vessel was confirmed.

TABLE 1

| Items (number | Manufacture Example 2 | | Manufacture Example 3 | | Manufacture Example 4 | | Manufacture Example 5 | | Manufacture Example 6 | |
|---|---|---|---|---|---|---|---|---|---|---|
| of layers) | Hoop | Helical | Hoop | Helical | Hoop | Helical | Hoop | Helical | Hoop | Helical |
| Step1 | 5 | 8 | 4 | 8 | 6 | 8 | 5 | 8 | 6 | 8 |
| Step2 | 5 | 6 | 6 | 6 | 4 | 6 | 6 | 6 | 5 | 6 |
| Step3 | 2 | 10 | 2 | 10 | 2 | 10 | 1 | 10 | 1 | 10 |
| Step4 | 1 | 0 | 1 | 0 | 1 | 0 | 1 | 0 | 1 | 0 |

Referring to Table 1, in Manufacture Example 4, 6, a larger number of hoop pattern layers was formed in the first composite layer, which is the innermost side of the composite layer, than the number of hoop pattern layers in the second composite layer, and in Manufacture Example 2, 3, and 5, the same number of hoop pattern layers or a fewer number of hoop pattern layers was formed.

The expected rupture pressure for the charging pressure of about 1,575 bar was measured through computer simulation by the same method as that of Experimental Example 1.

FIG. 6 illustrates an expected rupture pressure according to an increase in the number of hoop pattern layers of an inner composite layer.

Referring to FIG. 6, in Manufacture Example 6, it was confirmed that a high rupture pressure of about 1904.47 bar was shown, and when the hoop pattern layer was formed as a plurality of hoop pattern layers on the innermost side, it was possible to most effectively increase the durability of the pressure vessel.

On the other hand, in Manufacture Example 3, it was confirmed that when the number of hoop pattern layers of the second composite layer was further increased after the first composite layer was formed, a low rupture pressure of about 1889.62 bar was shown, and thus it could not be effective to increase the durability of the pressure vessel.

Therefore, according to the filament winding method according to the present invention, it is possible to overcome product defects and stacking limitations of the hoop pattern layer due to the step formed when the hoop pattern layer is formed in the circumferential direction of the liner, and in particular, effectively reinforce the circumferential direction of the liner by forming a larger number of hoop pattern layers on the innermost composite layer in contact with the liner, and since the hoop pattern layer is maximally formed at the beginning of forming the composite layer to easily secure the target durability, it is possible to secure durability greater than or equal to the durability of the pressure vessel manufactured by the conventional filament winding method even when the overall usage of the fiber reinforcement composite material is reduced.

In addition, not only it is possible to greatly increase manufacturing efficiency by decreasing the number of processes of the manufacturing process, but also increase the durability of the entirety of the pressure vessel manufactured thereby by 8% or higher due to the reduction in the maximum stress of the cylinder part and the increase in the rupture pressure.

So far, embodiments of the present invention have been mainly described. Those skilled in the art to which the present invention pertains will understand that the present invention may be implemented in a modified form without departing from the essential characteristics of the present invention. Therefore, the disclosed embodiments should be considered from an illustrative rather than a restrictive perspective. The scope of the present invention is described in the claims rather than the above description, and all differences in the equivalent scope should be construed as being included in the present invention.

The invention claimed is:

1. A filament winding method comprising:

forming a first pattern layer by winding a fiber reinforcement composite material on an outer circumferential surface of a liner;

forming a first composite layer by winding the fiber reinforcement composite material on an upper surface of the first pattern layer to form a second pattern layer; and forming a second composite layer by forming a first pattern layer of the second composite layer on an upper surface of the first composite layer and forming a second pattern layer of the second composite layer on an upper surface of the first pattern layer, wherein the first pattern layer is a hoop pattern layer formed by winding the fiber reinforcement composite material in a circumferential direction of the liner, and wherein a plurality of the first composite layer and the second composite layer are repeatedly formed such that a total number of composite layers satisfies;

$$C_N \leq 5,$$

wherein $C_N$ denotes the total number of the composite layers, and wherein the second pattern layer in said forming the first composite layer by winding the fiber reinforcement composite material on the upper surface of the first pattern layer to form the second pattern layer is formed as a tube helical pattern layer by winding the fiber reinforcement composite material on the upper surface of the first pattern layer and satisfies $$N1 > N2,$$

wherein N1 denotes the number of hoop pattern layers formed on an upper surface of the liner and N2 denotes the number of tube helical pattern layers formed on an upper surface of the hoop pattern layer.

2. The filament winding method of claim 1, wherein forming the second composite layer further comprises forming a helical pattern layer after forming the second pattern layer.

3. The filament winding method of claim 1, wherein in forming the second composite layer, the second pattern layer is formed as a tube helical pattern layer by winding the fiber reinforcement composite material on the upper surface of the first pattern layer and satisfies $$N_3 \geq N_4,$$

wherein $N_3$ denotes the number of hoop pattern layers of the second composite layer, and $N_4$ denotes the number of tube helical pattern layers.

4. The filament winding method of claim 3, wherein the tube helical pattern layer is wound at an angle in an inclusive range from 60 to 89° with respect to an axial direction of the liner.

5. The filament winding method of claim 3, wherein the number of hoop pattern layers formed in the circumferential direction of the liner is in an inclusive range of 20 to 35% of the number of layers formed on an entirety of the liner.

6. The filament winding method of claim 3, wherein a ratio of the number of tube helical pattern layers to the number of hoop pattern layers of the first composite layer is A:B, wherein A is in an inclusive range of 5 to 10, and B is in an inclusive range of 1 to 5, and a ratio of the number of tube helical pattern layers to the number of hoop pattern layers of the second composite layer is C:D, wherein C is in an inclusive range of 1 to 2, and D is 1.

7. The filament winding method of claim 1, wherein a winding start point of the first pattern layer in re-forming the first pattern layer on the upper surface of the first composite layer and forming the second pattern layer on the upper surface of the first pattern layer is changed closer to a center of the liner than a winding start point of the first pattern layer in forming the first pattern layer by winding the fiber reinforcement composite material on the outer circumferential surface of the liner.

* * * * *